Sept. 22, 1942.　　　　S. T. LESTER　　　　2,296,820
MEASURING APPARATUS
Filed Oct. 12, 1938

Stephen T. Lester　INVENTOR.
BY Hawgood & Van Horn
ATTORNEYS

Patented Sept. 22, 1942

2,296,820

UNITED STATES PATENT OFFICE 2,296,820

MEASURING APPARATUS

Stephen T. Lester, Cleveland Heights, Ohio

Application October 12, 1938, Serial No. 234,665

4 Claims. (Cl. 33—174)

This invention relates to measuring apparatus and particularly to apparatus intended for the extremely accurate measurement of gaging of articles.

An object of the invention is to provide an improved measuring apparatus with which any of a large number of measurements may be obtained with extreme accuracy.

Another object is to provide an improved measuring apparatus which may easily be arranged to provide any desired measurement.

Another object is to provide an improved measuring appartus which will consist of few and simple parts.

Another object is to provide an improved measuring apparatus which will be small and easily handled.

Another object is to provide an improved measuring apparatus which will not be affected by handling.

Another object is to provide an improved measuring apparatus in which maximum number of measurements may be obtained with a minimum number of parts.

Another object is to provide an improved measuring apparatus in which all the parts will be of substantial size and therefore convenient in manufacturing and handling.

Another object is to provide an improved measuring apparatus in which the accuracy is dependent on the parts chosen rather than upon adjustments.

Another object is to provide an improved measuring apparatus which may be easily and economically manufactured.

Other objects will hereinafter appear.

The invention will be better understood from the description of one practical embodiment thereof, illustrated in the accompanying drawing, in which.

Figure 1:
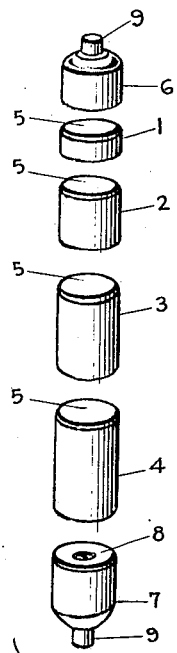
Figure 1 is a perspective view of a number of parts preparatory to assembly into operative relation.
Figure 2:
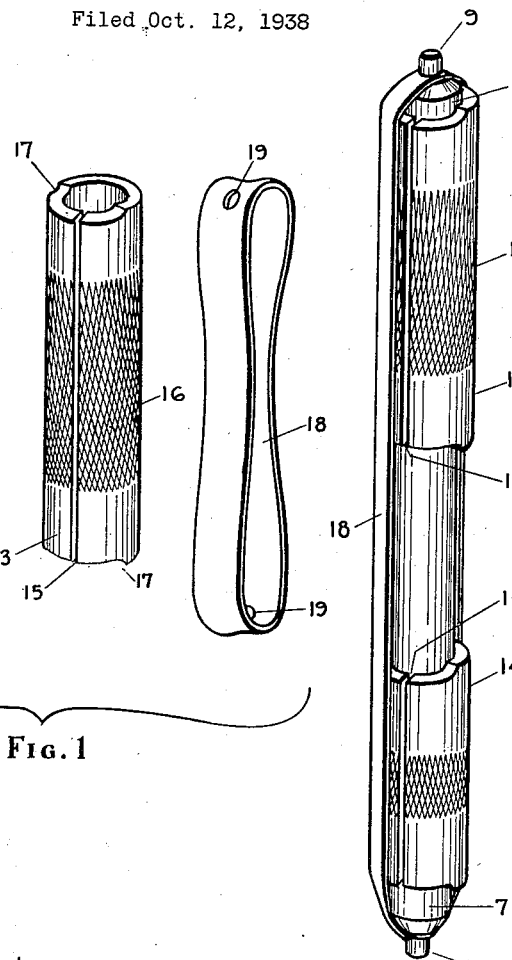
Figure 2 is a perspective view of a plurality of parts such as shown in Figure 1, in assembled relation ready for use as a gage.

In the drawing are illustrated a series of gage blocks 1, 2, 3, and 4 of cylindrical shape having plane parallel ends. The distances between the plane surfaces on the ends of each block are very accurately determined, the blocks being lapped or otherwise carefully finished so that these surfaces are not only an accurate and known distance apart, but are precisely normal to the axes of the blocks, and so that the planes are sufficiently accurate that the blocks may be "wrung" together, being held in position by the exclusion of air from between the adjacent block surfaces and the atmospheric pressure on the exterior of the blocks.

In addition to the cylindrical blocks having two plane end surfaces, there are provided a series of end blocks 6 and 7 each of which has one plane surface 8, and opposite thereto is provided with a contacting anvil 9 for use in obtaining measurements.

The anvil is shown as an adjustable cylindrical piece of metal having a threaded shank 10 engaging a cylindrical thread 11 in an axial perforation through the end block, and which may be locked in place by means of a lock screw or threaded plug 12, likewise threaded in the opening through the end block.

It will be apparent that by backing off the lock screw 12, the contact tip 9 may be adjusted by turning the same relative to the end block, and may be locked into its newly adjusted position by tightening the lock screw securely against the end of contact tip 9.

The blocks, other than the end blocks, will hereinafter be referred to as "cylindrical blocks" which may be understood to refer to those blocks having two parallel end surfaces, and irrespective of their cross sectional shape. Though the circular form shown is most convenient, elliptical cylinders, or even prismatic shapes might be used if desired.

By properly choosing the thickness between the plane surfaces 5 of the cylindrical blocks and between the tips 9 and end surfaces 8 of the end blocks, a large number of measurements can be obtained with extreme accuracy, fully equivalent to that obtained by any other type block now known. For example, with only five end blocks and thirty-three cylindrical blocks, I can obtain all measurements from 2.4005 inches upwardly to twenty-two inches, in steps of .00025 inch.

For this example, two end blocks are provided which are adjusted to measure accurately exactly one inch in length. One end block is furnished which measures .995 inch, a fourth measures 1.0025 inches, and the fifth measures 1.005 inches.

The cylindrical blocks may be considered as divided in four series, the first of which, as measured across their plane surfaces 5, are in length respectively .100, .200, .300, .400, .500, .600, .700, .800, and .900 inches.

The second series consists of nine more blocks measuring across their plane surfaces .201, .202, .203, .204, .205, .206, .207, .208, .209 inches.

The third set comprises blocks of lengths of .210, .220, .230, .240, .250, .260, .270, .280, and .290 inches.

The remaining six blocks measure respectively one, two, three, four, five, and six inches.

If, for example, it is desired with this set of blocks to measure a distance of 5.60675 inches, it is only necessary to assemble the end blocks measuring .9995 and 1.00025 inches with the three inch block, the .400 inch block and the .207 inch block.

If a quarter of a thousandth more is required, the 1.0005 inch end block is substituted for 1.00025 inch. If a quarter of a thousandth less is desired, one of the one inch blocks is substituted for the 1.00025 inch, so that it will be apparent that dimensions and quite odd decimal fractions may be readily obtained with a small number of blocks.

It is also apparent that no block is less than .100 inch in thickness, and only one is less than .200 inch, so that all are large enough for convenient handling.

To assist in maintaining the blocks in position after assembly (in which they would otherwise be held only by atmospheric pressure due to the fact that they are wrung together) there are provided a series of sleeves 13 and 14, shown as generally cylindrical in shape, and which are preferably composed of non-metallic material which is an insulator against both heat and electricity, such, for instance, as hard rubber or molded plastic material.

These sleeves are shown as slotted lengthwise at 15 to permit the edges to be somewhat sprung apart upon being put over the blocks, so that the sleeves will tightly grip the same.

Their exterior may be conveniently roughened as by knurling 16 to provide a firm grip for the user.

Figure 3:
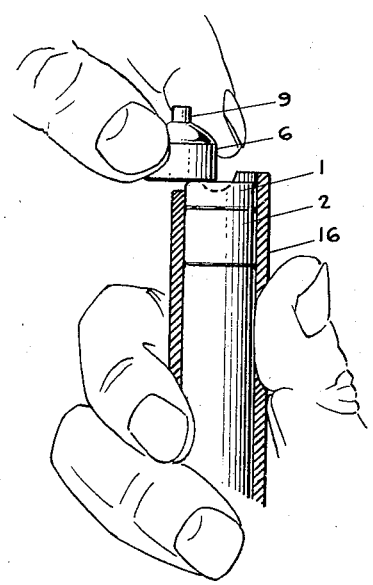
Figure 3 is a fragmentary, partly sectional view showing the manner in which the parts may be assembled.
Figure 4:
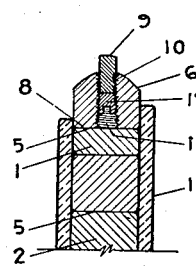
Figure 4 is an enlarged fragmentary sectional view of some of the parts of the preceding figures.

Their ends are shown as stepped or notched at 17 for about one-half their extent. The shaping of the end in this manner is useful in the assembly of the blocks, as will be apparent from Figure 3, which shows how one block 1 may be inserted within the sleeve with its end projecting slightly beyond the notched portion of the sleeve, but not quite reaching the longer portion thereof, and how the end of the next block 6 as it is wrung onto the first block, may be guided into position by the projecting flange-like cylindrical part of the sleeve projecting beyond the notch.

After the blocks have been caused to adhere, the sleeve is, of course, slid over their juncture to assist in preventing displacement either radially or by relative tilting of their axes.

The sleeve further serves as a handle, preventing the transmission of heat from the hand of the operator to the blocks, or the transmission of electric current, should the apparatus be used upon or touched to any article in an electric circuit.

Further to hold the blocks in position, there are provided a plurality of elastic clamps, each of which is in effect an endless band 18 of elastic material such as rubber provided with two oppositely disposed holes 19.

The user can select one of these clamps which is slightly shorter than his assembled blocks, pass the end 9 through one hole 19 of the band, then stretch the band until it can pass the other tip 9 through the other hole 19, whereupon he releases the band which resiliently presses the blocks together.

It will be apparent that when a series of blocks have been assembled with their appropriate sleeve or sleeves and clamping band, the finished article is no more bulky or heavy than would be a one-piece gage made to give the same measure.

It will also be apparent that the accuracy of the assembled blocks is the full equivalent of any type of measuring standard, such as the much more cumbersome rectangular blocks now in vogue.

Moreover, with a comparatively few parts any one of a large number of gage sizes can be instantly provided by properly assembling blocks from the thirty-eight sizes mentioned, and that a gage can be quickly shortened or lengthened by a small gradation, as for instance, where "go" and "no go" gaging is required.

While I have described the illustrated embodiment of my invention in some particularity, obviously many others will readily occur to those skilled in this art, and I do not, therefore, limit myself to the precise details shown and described, but claim as my invention all embodiments, variations, and modifications thereof coming within the scope of the appended claims.

I claim:

1. An end block comprising a cylindrical metallic piece having a plane base normal to its axis, the block being formed with an axial threaded aperture therein, an adjustable contacting tip having a threaded shank engaging the thread within the aperture, and a locking screw contacting said shank and threaded in said aperture.

2. A gage comprising a plurality of cylindrical blocks each having parallel plane end surfaces at a predetermined distance, the blocks being secured together axially by the bringing in contact of the plane end surfaces of successive blocks and excluding air from the space between said surfaces, and a cylindrical sleeve slidable axially over the assembled blocks and holding said blocks from radial displacement relative each other, said sleeve being composed of heat insulating material, projecting contacting tips on the end blocks of the series, and an elastic band engaging said contacting tips and retaining the sleeve against axial movement beyond the series of blocks.

3. A gage comprising a plurality of cylindrical blocks each having parallel plane end surfaces at a predetermined distance, the blocks being secured together axially by the bringing in contact of the plane end surfaces of successive blocks and excluding air from the space between said surfaces, and a slit sleeve slidable axially over the assembled blocks and holding said blocks from radial displacement relative each other, each end of the sleeve being defined by two spaced planes normal to its axis.

4. A gage comprising a plurality of cylindrical blocks each having parallel plane end surfaces at a predetermined distance, the blocks being secured together by said surfaces being brought into contact to exclude air, and a slit cylindrical resilient sleeve of slightly less normal internal diameter than the diameter of the blocks frictionally engaging the cylindrical surfaces of said blocks and maintaining them from relative radial displacement.

STEPHEN T. LESTER.